(12) United States Patent
Hinohara et al.

(10) Patent No.: US 9,139,719 B2
(45) Date of Patent: Sep. 22, 2015

(54) RUBBER COMPOSITION AND PNEUMATIC TIRE

(75) Inventors: Yuko Hinohara, Kobe (JP); Kazuyuki Nishioka, Kobe (JP); Takahiro Mabuchi, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 412 days.

(21) Appl. No.: 13/702,245

(22) PCT Filed: Jul. 22, 2011

(86) PCT No.: PCT/JP2011/066704
§ 371 (c)(1),
(2), (4) Date: Dec. 5, 2012

(87) PCT Pub. No.: WO2012/011570
PCT Pub. Date: Jan. 26, 2012

(65) Prior Publication Data
US 2013/0090422 A1    Apr. 11, 2013

(30) Foreign Application Priority Data

Jul. 23, 2010   (JP) .................. 2010-166247

(51) Int. Cl.
*C08L 9/06* (2006.01)
*C08K 3/36* (2006.01)
*B60C 1/00* (2006.01)

(52) U.S. Cl.
CPC ............... *C08L 9/06* (2013.01); *B60C 1/0016* (2013.04); *C08K 3/36* (2013.01); *Y02T 10/862* (2013.01)

(58) Field of Classification Search
CPC .................................. C08L 9/06; C08K 3/36
USPC ......................... 524/492, 535, 547
See application file for complete search history.

(56) References Cited

U.S. PATENT DOCUMENTS

| | | |
|---|---|---|
| 2009/0247692 A1 | 10/2009 | Oshima et al. |
| 2009/0247696 A1 | 10/2009 | Fuji et al. |
| 2010/0056709 A1* | 3/2010 | Oshima ............... 524/571 |
| 2010/0056711 A1 | 3/2010 | Fujii et al. |
| 2010/0056713 A1 | 3/2010 | Oshima |

FOREIGN PATENT DOCUMENTS

| | | |
|---|---|---|
| CN | 101671418 A | 3/2010 |
| JP | 2000-344955 A | 12/2000 |
| JP | 2010-77412 A | 4/2010 |
| JP | 2010-77414 A | 4/2010 |
| JP | 2010-77416 A | 4/2010 |
| JP | 2010077414 A * | 4/2010 |

OTHER PUBLICATIONS

English machine-generated translation of JP-2000-344955-A dated Dec. 12, 2000.

* cited by examiner

*Primary Examiner* — Ling Choi
*Assistant Examiner* — Ronald Grinsted
(74) *Attorney, Agent, or Firm* — Birch, Stewart, Kolasch & Birch, LLP

(57) ABSTRACT

The present invention provides a rubber composition that achieves a well-balanced improvement in fuel economy, wet-grip performance, and abrasion resistance, and a pneumatic tire formed from the rubber composition. The present invention relates to a rubber composition, including a rubber component and silica, wherein the rubber component contains not less than 5% by mass of a conjugated diene polymer, based on 100% by mass of the rubber component, the conjugated diene polymer containing a constituent unit derived from a conjugated diene and a constituent unit represented by the following formula (I):

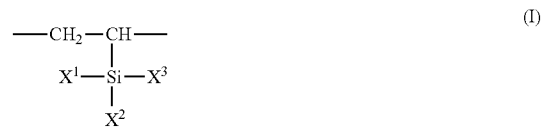

at least one terminal of the conjugated diene polymer being modified by a compound containing a group represented by the following formula (II):

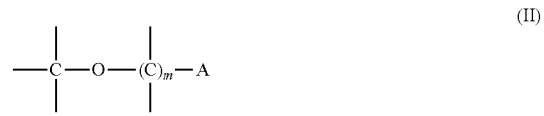

and wherein the silica is contained in an amount of 5 to 150 parts by mass per 100 parts by mass of the rubber component.

9 Claims, No Drawings

RUBBER COMPOSITION AND PNEUMATIC TIRE

TECHNICAL FIELD

The present invention relates to a rubber composition and a pneumatic tire formed from the rubber composition.

BACKGROUND ART

The demands on automobiles for better fuel economy have been increasing in recent years as concern with environmental issues has been rising. Hence, better fuel economy is also required of rubber compositions used for automotive tires. For example, rubber compositions containing a conjugated diene polymer (e.g. polybutadiene, butadiene-styrene copolymer) and filler (e.g. carbon black, silica) are used as the rubber compositions for automotive tires.

Patent Literature 1, for example, proposes a method for improving fuel economy. The method uses a diene rubber that has been modified by an organosilicon compound containing an amino group and an alkoxy group. In recent years, however, further improvement in fuel economy has been demanded. Moreover, since some other properties required of the rubber compositions for automotive tires, such as wet-grip performance and abrasion resistance, generally have trade-off relationships with fuel economy, it has been difficult to achieve these properties at high levels in good balance.

CITATION LIST

Patent Literature

Patent Literature 1: JP 2000-344955 A

SUMMARY OF INVENTION

Technical Problem

The present invention aims to solve the above problems and provide a rubber composition that achieves a well-balanced improvement in fuel economy, wet-grip performance, and abrasion resistance, and a pneumatic tire formed from the rubber composition.

Solution to Problem

The present invention relates to a rubber composition, including a rubber component and silica, wherein the rubber component contains not less than 5% by mass of a conjugated diene polymer, based on 100% by mass of the rubber component, the conjugated diene polymer containing a constituent unit derived from a conjugated diene and a constituent unit represented by the following formula (I):

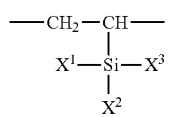

wherein $X^1$, $X^2$, and $X^3$ each independently represent a group represented by the formula (Ia) below, a hydroxyl group, a hydrocarbyl group, or a substituted hydrocarbyl group, and at least one of the $X^1$, $X^2$, and $X^3$ is a hydroxyl group or a group represented by the formula (Ia):

wherein $R^1$ and $R^2$ each independently represent a $C_{1-6}$ hydrocarbyl group, a $C_{1-6}$ substituted hydrocarbyl group, a silyl group, or a substituted silyl group, and the $R^1$ and $R^2$ may be bonded to each other to form a cyclic structure together with the nitrogen atom, at least one terminal of the conjugated diene polymer being modified by a compound containing a group represented by the following formula (II):

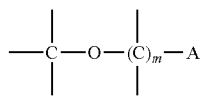

wherein m represents an integer of 1 to 11; and A represents a functional group containing a nitrogen atom, and wherein the silica is contained in an amount of 5 to 150 parts by mass per 100 parts by mass of the rubber component.

The $R^1$ and $R^2$ in the formula (Ia) are preferably $C_{1-6}$ hydrocarbyl groups.

Two of the $X^1$, $X^2$, and $X^3$ in the formula (I) are preferably selected from the group consisting of a group represented by the formula (Ia) and a hydroxyl group.

The compound containing a group represented by the formula (II) is preferably a compound represented by the following formula (III):

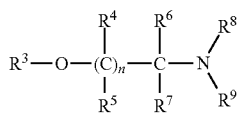

wherein n represents an integer of 0 to 10; $R^3$ represents a hydrocarbyl group; $R^4$, $R^5$, $R^6$, and $R^7$ each independently represent a hydrogen atom, a $C_{1-5}$ hydrocarbyl group, a $C_{1-5}$ substituted hydrocarbyl group, or a $C_{1-5}$ hydrocarbyloxy group, and when a plurality of $R^4$s and a plurality of $R^5$s are present, the plurality of $R^4$s and the plurality of $R^5$s may be the same or different from one another; $R^8$ and $R^9$ each independently represent a $C_{1-6}$ group optionally containing at least one atom selected from the group consisting of a nitrogen atom, an oxygen atom, and a silicon atom, the $R^8$ and $R^9$ may be bonded to each other to form a cyclic structure together with the nitrogen atom, and the $R^8$ and $R^9$ may form a single group bonded to the nitrogen via a double bond.

One of the $R^6$ and $R^7$ in the formula (III) is preferably a hydrogen atom.

The conjugated diene polymer preferably has a vinyl bond content of at least 10 mol % but not more than 80 mol %, based on 100 mol % of the constituent unit derived from a conjugated diene.

The rubber composition preferably includes at least one of natural rubber and butadiene rubber.

Preferably, the silica has a nitrogen adsorption specific surface area of 40 to 400 m²/g.

The rubber composition is preferably for use as a rubber composition for a tread.

The present invention also relates to a pneumatic tire, formed from the rubber composition.

Advantageous Effects of Invention

According to the present invention, the rubber composition contains a specific conjugated diene polymer and silica, and therefore a pneumatic tire can be provided that has been improved in fuel economy, wet-grip performance, and abrasion resistance in good balance.

DESCRIPTION OF EMBODIMENTS

The rubber composition of the present invention contains silica and a conjugated diene polymer which contains a constituent unit derived from a conjugated diene and a constituent unit represented by the following formula (I):

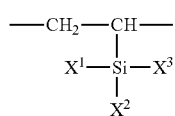
(I)

wherein $X^1$, $X^2$, and $X^3$ each independently represent a group represented by the formula (Ia) below, a hydroxyl group, a hydrocarbyl group, or a substituted hydrocarbyl group, and at least one of the $X^1$, $X^2$, and $X^3$ is a hydroxyl group or a group represented by the formula (Ia):

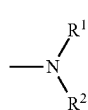
(Ia)

wherein $R^1$ and $R^2$ each independently represent a $C_{1-6}$ hydrocarbyl group, a $C_{1-6}$ substituted hydrocarbyl group, a silyl group, or a substituted silyl group, and the $R^1$ and $R^2$ may be bonded to each other to form a cyclic structure together with the nitrogen atom, and
of which at least one terminal is modified by a compound containing a group represented by the following formula (II):

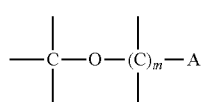
(II)

wherein m represents an integer of 1 to 11; and A represents a functional group containing a nitrogen atom.

Examples of the conjugated diene for the constituent unit derived from a conjugated diene include 1,3-butadiene, isoprene, 1,3-pentadiene, 2,3-dimethyl-1,3-butadiene, and 1,3-hexadiene. One of these may be used alone, or two or more of these may be used together. In terms of easy availability, 1,3-butadiene and isoprene are preferred.

The $X^1$, $X^2$, and $X^3$ in the formula (I) for the constituent unit represented by the formula (I) each independently represent a group represented by the formula (Ia), a hydroxyl group, a hydrocarbyl group, or a substituted hydrocarbyl group, and at least one of the $X^1$, $X^2$, and $X^3$ is a group represented by the formula (Ia) or a hydroxyl group.

The $R^1$ and $R^2$ in the formula (Ia) each independently represent a $C_{1-6}$ hydrocarbyl group, a $C_{1-6}$ substituted hydrocarbyl group, a silyl group, or a substituted silyl group, and the $R^1$ and $R^2$ may be bonded to each other to form a cyclic structure together with the nitrogen atom.

As used herein, the term "hydrocarbyl group" denotes a hydrocarbon residue. This hydrocarbon residue refers to a monovalent group formed by removing hydrogen from a hydrocarbon. The term "substituted hydrocarbyl group" denotes a group formed by substituting one or more hydrogen atoms in a hydrocarbon residue with substituents. The term "hydrocarbyloxy group" denotes a group formed by substituting the hydrogen atom of a hydroxyl group with a hydrocarbyl group, while the term "substituted hydrocarbyloxy group" denotes a group formed by substituting one or more hydrogen atoms in a hydrocarbyloxy group with substituents. The term "substituted silyl group" denotes a group formed by substituting one or more hydrogen atoms in a silyl group with substituents.

Examples of the $C_{1-6}$ hydrocarbyl group for the $R^1$ and $R^2$ include alkyl groups such as a methyl group, an ethyl group, a n-propyl group, an isopropyl group, a n-butyl group, a sec-butyl group, a tert-butyl group, a n-pentyl group, a neopentyl group, an isopentyl group, and a n-hexyl group; cycloalkyl groups such as a cyclohexyl group; and a phenyl group.

Examples of the $C_{1-6}$ substituted hydrocarbyl group for the $R^1$ and $R^2$ include substituted hydrocarbyl groups each containing at least one substituent selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as a dimethylaminoethyl group and a diethylaminoethyl group; the groups containing an oxygen atom-bearing group as a substituent can be exemplified by alkoxyalkyl groups such as a methoxymethyl group, a methoxyethyl group, an ethoxymethyl group, and an ethoxyethyl group; and the groups containing a silicon atom-bearing group as a substituent can be exemplified by trialkylsilylalkyl groups such as a trimethylsilylmethyl group, and the like.

Examples of the substituted silyl group for the $R^1$ and $R^2$ include trialkylsilyl groups such as a trimethylsilyl group, a triethylsilyl group, and a t-butyldimethylsilyl group.

Examples of the group in which the $R^1$ and $R^2$ are bonded to each other include $C_{1-12}$ divalent groups optionally each containing at least one atom selected from the group consisting of a nitrogen atom, an oxygen atom, and a silicon atom. Specific examples thereof include alkylene groups such as a trimethylene group, a tetramethylene group, a pentamethylene group, and a hexamethylene group; oxydialkylene groups such as an oxydiethylene group and an oxydipropylene group; and nitrogenous groups such as the group represented by —$CH_2CH_2$—NH—$CH_2$— and the group represented by —$CH_2CH_2$—N=CH—.

The group in which the $R^1$ and $R^2$ are bonded to each other is preferably a nitrogenous group, and more preferably the group represented by —$CH_2CH_2$—NH—$CH_2$— or the group represented by —$CH_2CH_2$—N=CH—.

The hydrocarbyl group for the $R^1$ and $R^2$ is preferably an alkyl group, more preferably a $C_{1-4}$ alkyl group, still more preferably a methyl, ethyl, n-propyl, or n-butyl group, and particularly preferably an ethyl or n-butyl group. The substituted hydrocarbyl group for the $R^1$ and $R^2$ is preferably an alkoxyalkyl group, and more preferably a $C_{1-4}$ alkoxyalkyl group. The substituted silyl group for the $R^1$ and $R^2$ is preferably a trialkylsilyl group, and more preferably a trimethylsilyl group.

Preferably, the $R^1$ and $R^2$ are each an alkyl group, an alkoxyalkyl group, or a substituted silyl group, or are a nitrogenous group in which the $R^1$ and $R^2$ are bonded to each other, and they are each more preferably an alkyl group, still more preferably a $C_{1-4}$ alkyl group, and further preferably a methyl, ethyl, n-propyl, or n-butyl group.

Examples of the group represented by the formula (Ia) include acyclic amino groups and cyclic amino groups.

Examples of the acyclic amino groups include dialkylamino groups such as a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group, and an ethylmethylamino group; di(alkoxyalkyl)amino groups such as a di(methoxymethyl)amino group, a di(methoxyethyl)amino group, a di(ethoxymethyl)amino group, and a di(ethoxyethyl)amino group; and di(trialkylsilyl)amino groups such as a di(trimethylsilyl)amino group and a di(t-butyldimethylsilyl)amino group.

Examples of the cyclic amino groups include 1-polymethyleneimino groups such as a 1-pyrrolidinyl group, a 1-piperidino group, a 1-hexamethyleneimino group, a 1-heptamethyleneimino group, a 1-octamethyleneimino group, a 1-decamethyleneimino group, and a 1-dodecamethyleneimino group. Examples of the cyclic amino groups also include a 1-imidazolyl group, a 4,5-dihydro-1-imidazolyl group, a 1-imidazolidinyl group, a 1-piperazinyl group, and a morpholino group.

In terms of economic efficiency and easy availability, the group represented by the formula (Ia) is preferably an acyclic amino group, more preferably a dialkylamino group, still more preferably a dialkylamino group containing a $C_{1-4}$ alkyl substituent, and further preferably a dimethylamino group, a diethylamino group, a di(n-propyl)amino group, or a di(n-butyl)amino group.

Examples of the hydrocarbyl group for the $X^1$, $X^2$, and $X^3$ in the formula (I) include alkyl groups such as a methyl group, an ethyl group, a n-propyl group, an isopropyl group, a n-butyl group, a sec-butyl group, and a tert-butyl group. Examples of the substituted hydrocarbyl group include alkoxyalkyl groups such as a methoxymethyl group, an ethoxymethyl group, a methoxyethyl group, and an ethoxyethyl group.

The hydrocarbyl group for the $X^1$, $X^2$, and $X^3$ is preferably an alkyl group, more preferably a $C_{1-4}$ alkyl group, and still more preferably a methyl group or an ethyl group. The substituted hydrocarbyl group for the $X^1$, $X^2$, and $X^3$ is preferably an alkoxyalkyl group, and more preferably a $C_{1-4}$ alkoxyalkyl group.

The hydrocarbyl group or substituted hydrocarbyl group for the $X^1$, $X^2$, and $X^3$ is preferably an alkyl or alkoxyalkyl group, more preferably a $C_{1-4}$ alkyl or $C_{1-4}$ alkoxyalkyl group, still more preferably a $C_{1-4}$ alkyl group, and further preferably a methyl or ethyl group.

At least one of the $X^1$, $X^2$, and $X^3$ in the formula (I) is a hydroxyl group or a group represented by the formula (Ia). Preferably, at least two of the $X^1$, $X^2$, and $X^3$ are each a hydroxyl group or a group represented by the formula (Ia). More preferably, two of the $X^1$, $X^2$, and $X^3$ are each a hydroxyl group or a group represented by the formula (Ia). In terms of achieving fuel economy, wet-grip performance, and abrasion resistance at high levels in good balance, it is preferable that at least one of the $X^1$, $X^2$, and $X^3$ be a hydroxyl group, more preferably that at least two of the $X^1$, $X^2$, and $X^3$ be hydroxyl groups, and still more preferably that two of the $X^1$, $X^2$, and $X^3$ be hydroxyl groups.

In terms of enhancing fuel economy, wet-grip performance, and abrasion resistance in good balance, the constituent unit represented by the formula (I) is preferably a constituent unit in which two of the $X^1$, $X^2$, and $X^3$ are each an acyclic amino group or a hydroxyl group. The constituent unit in which two of the $X^1$, $X^2$, and $X^3$ are acyclic amino groups is preferably a bis(dialkylamino)alkylvinylsilane unit, and is more preferably a bis(dimethylamino)methylvinylsilane unit, bis(diethylamino)methylvinylsilane unit, bis(di(n-propyl)amino)methylvinylsilane unit, or bis(di(n-butyl)amino)methylvinylsilane unit. The constituent unit in which two of the $X^1$, $X^2$, and $X^3$ are hydroxyl groups is preferably a dihydroxyalkylvinylsilane unit, and more preferably a dihydroxymethylvinylsilane unit.

In terms of enhancing fuel economy, wet-grip performance, and abrasion resistance in good balance, the amount of the constituent unit represented by the formula (I) in the conjugated diene polymer (per unit mass of the polymer) is preferably at least 0.001 mmol/g-polymer but not more than 0.1 mmol/g-polymer. The amount is more preferably at least 0.002 mmol/g-polymer but not more than 0.07 mmol/g-polymer. The amount is still more preferably at least 0.003 mmol/g-polymer but not more than 0.05 mmol/g-polymer.

The conjugated diene polymer is a polymer having at least one terminal modified by a compound containing a group represented by the following formula (II):

wherein m represents an integer of 1 to 11; and A represents a functional group containing a nitrogen atom.

The m represents an integer of 1 to 11. In terms of enhancing fuel economy, the m is preferably not less than 1. In terms of enhancing the economic efficiency of the production, the m is preferably not more than 4. The A is a functional group containing a nitrogen atom, and examples thereof include amino groups, an isocyano group, a cyano group, a pyridyl group, a piperidyl group, a pyrazinyl group, and a morpholino group.

Examples of the compound containing a group represented by the formula (II) include compounds represented by the following (III):

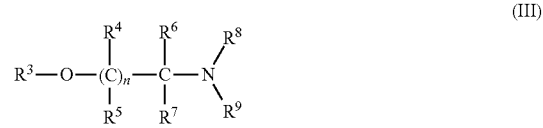

wherein n represents an integer of 0 to 10; $R^3$ represents a $C_{1-5}$ hydrocarbyl group; $R^4$, $R^5$, $R^6$, and $R^7$ each independently represent a hydrogen atom, a $C_{1-5}$ hydrocarbyl group, a $C_{1-5}$ substituted hydrocarbyl group, or a $C_{1-5}$ hydrocarbyloxy group, and when a plurality of $R^4$s and a plurality of $R^5$s are present, the plurality of $R^4$s and the plurality of $R^5$s may be the same or different from one another; $R^8$ and $R^9$ each independently represent a $C_{1-6}$ group optionally containing at least one atom selected from the group consisting of a nitrogen atom, an oxygen atom, and a silicon atom, the $R^8$ and $R^9$ may be bonded to each other to form a cyclic structure together with the nitrogen atom, and the $R^8$ and $R^9$ may form a single group bonded to the nitrogen via a double bond.

The n in the formula (III) represents an integer of 0 to 10. In terms of enhancing economic efficiency, the n is preferably not more than 3, and more preferably 0.

The $R^3$ in the formula (III) represents a $C_{1-5}$ hydrocarbyl group. Examples of the hydrocarbyl group for the $R^3$ include alkyl groups such as a methyl group, an ethyl group, a n-propyl group, an isopropyl group, a n-butyl group, a sec-butyl group, and a t-butyl group.

The hydrocarbyl group for the $R^3$ is preferably an alkyl group, more preferably a $C_{1-4}$ alkyl group, and still more preferably a methyl group or an ethyl group.

The $R^4$ to $R^7$ in the formula (III) each independently represent a hydrogen atom, a $C_{1-5}$ hydrocarbyl group, a $C_{1-5}$ substituted hydrocarbyl group, or a $C_{1-5}$ hydrocarbyloxy group, and when a plurality of $R^4$s and a plurality of $R^5$s are present, the plurality of $R^4$s and the plurality of $R^5$s may be the same or different from one another.

Examples of the hydrocarbyl group for the $R^4$ to $R^7$ include alkyl groups such as a methyl group, an ethyl group, a n-propyl group, an isopropyl group, a n-butyl group, a sec-butyl group, and a t-butyl group.

Examples of the substituted hydrocarbyl group for the $R^4$ to $R^7$ include substituted hydrocarbyl groups each containing at least one substituent selected from the group consisting of nitrogen atom-bearing groups and oxygen atom-bearing groups. The groups containing a nitrogen atom-bearing group as a substituent can be exemplified by dialkylaminoalkyl groups such as a dimethylaminoethyl group and a diethylaminoethyl group. The groups containing an oxygen atom-bearing group as a substituent can be exemplified by alkoxyalkyl groups such as a methoxymethyl group, a methoxyethyl group, an ethoxymethyl group, and an ethoxyethyl group, and the like.

Examples of the hydrocarbyloxy group for the $R^4$ to $R^7$ include alkoxy groups such as a methoxy group, an ethoxy group, a n-propoxy group, an isopropoxy group, a n-butoxy group, a sec-butoxy group, and a t-butoxy group.

The hydrocarbyl group for the $R^4$ to $R^7$ is preferably an alkyl group, more preferably a $C_{1-4}$ alkyl group, and still more preferably a methyl group or an ethyl group.

The substituted hydrocarbyl group for the $R^4$ to $R^7$ is preferably an alkoxyalkyl group, more preferably a $C_{1-4}$ alkoxyalkyl group, and still more preferably a methoxymethyl group or an ethoxyethyl group.

The hydrocarbyloxy group for the $R^4$ to $R^7$ is preferably an alkoxy group, more preferably a $C_{1-3}$ alkoxy group, and still more preferably a methoxy group or an ethoxy group.

In terms of enhancing fuel economy, wet-grip performance, and abrasion resistance in good balance and of economic efficiency, one of the $R^6$ and $R^7$ is preferably a hydrogen atom. More preferably, one of the $R^6$ and $R^7$ is a hydrogen atom while the other is an alkyl group or an alkoxy group. Still more preferably, one of the $R^6$ and $R^7$ is a hydrogen atom while the other is an alkoxy group, particularly preferably a methoxy group or an ethoxy group.

The $R^8$ and $R^9$ in the formula (III) each independently represent a $C_{1-6}$ group optionally containing at least one atom selected from the group consisting of a nitrogen atom, an oxygen atom, and a silicon atom, the $R^8$ and $R^9$ may be bonded to each other to form a cyclic structure together with the nitrogen atom, and the $R^8$ and $R^9$ may form a single group bonded to the nitrogen via a double bond.

Examples of the $R^8$ and $R^9$ in the formula (III) include $C_{1-6}$ hydrocarbyl groups, $C_{1-6}$ substituted hydrocarbyl groups, and substituted silyl groups.

Examples of the hydrocarbyl groups for the $R^8$ and $R^9$ include alkyl groups such as a methyl group, an ethyl group, a n-propyl group, an isopropyl group, a n-butyl group, a sec-butyl group, a tert-butyl group, a n-pentyl group, a neopentyl group, an isopentyl group, and a n-hexyl group; cycloalkyl groups such as a cyclohexyl group; and a phenyl group.

Examples of the substituted hydrocarbyl groups for the $R^8$ and $R^9$ include substituted hydrocarbyl groups each containing at least one substituent selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as a dimethylaminoethyl group and a diethylaminoethyl group. The groups containing an oxygen atom-bearing group as a substituent can be exemplified by: alkoxyalkyl groups such as a methoxymethyl group, a methoxyethyl group, an ethoxymethyl group, and an ethoxyethyl group; alkylene oxide groups such as an epoxy group and a tetrahydrofuranyl group; and alkylene oxide alkyl groups such as a glycidyl group and a tetrahydrofurfuryl group. The groups containing a silicon atom-bearing group as a substituent can be exemplified by trialkylsilylalkyl groups such as a trimethylsilylmethyl group, and the like.

Herein, the term "alkylene oxide group" denotes a monovalent group formed by removing a hydrogen atom on the ring of a cyclic ether compound. The term "alkylene oxide alkyl group" denotes a group formed by substituting at least hydrogen atom in an alkyl group with an alkylene oxide group.

Examples of the substituted silyl groups for the $R^8$ and $R^9$ include trialkylsilyl groups such as a trimethylsilyl group, a triethylsilyl group, and a t-butyldimethylsilyl group; and trialkoxysilyl groups such as a trimethoxysilyl group.

Examples of the group in which the $R^8$ and $R^9$ are bonded to each other include $C_{2-12}$ divalent groups optionally each containing at least one atom selected from the group consisting of a nitrogen atom, an oxygen atom, and a silicon atom. Specific examples thereof include alkylene groups such as a trimethylene group, a tetramethylene group, a pentamethylene group, and a hexamethylene group; oxydialkylene groups such as an oxydiethylene group and an oxydipropylene group; and nitrogenous groups such as the group represented by —$CH_2CH_2$—NH—$CH_2$— and the group represented by —$CH_2CH_2$—N=CH—.

The group in which the $R^8$ and $R^9$ are bonded to each other is preferably a nitrogenous group, and more preferably the group represented by —$CH_2CH_2$—NH—$CH_2$— or the group represented by —$CH_2CH_2$—N=CH—.

Examples of the single group bonded to the nitrogen via a double bond for the $R^8$ and $R^9$ include $C_{2-12}$ divalent groups optionally each containing at least one atom selected from the group consisting of a nitrogen atom, an oxygen atom, and a silicon atom. Specific examples thereof include an ethylidene group, a 1-methylpropylidene group, a 1,3-dimethylbutylidene group, a 1-methylethylidene group, and a 4-N,N-dimethylaminobenzylidene group.

The hydrocarbyl group for the $R^8$ and $R^9$ is preferably an alkyl group, more preferably a $C_{1-4}$ alkyl group, still more preferably a methyl, ethyl, n-propyl, or n-butyl group, and further preferably a methyl or ethyl group. The substituted hydrocarbyl group for the $R^8$ and $R^9$ is preferably an alkoxyalkyl group, an alkylene oxide group, or an alkylene oxide alkyl group. The substituted silyl group for the $R^8$ and $R^9$ is preferably a trialkylsilyl or trialkoxysilyl group, more preferably a trialkylsilyl group, and still more preferably a trimethylsilyl or triethylsilyl group.

Preferably, the $R^8$ and $R^9$ are each an alkyl group, an alkoxyalkyl group, or a substituted silyl group, or are a nitrogenous group in which the $R^8$ and $R^9$ are bonded to each other, and they are each more preferably a $C_{1-4}$ alkyl group, still more preferably a methyl, ethyl, n-propyl, or n-butyl group, and further preferably a methyl or ethyl group.

Examples of the amino group in which the $R^8$ and $R^9$ are bonded to the nitrogen atom include acyclic amino groups and cyclic amino groups.

Examples of the acyclic amino groups include: dialkylamino groups such as a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group, and an ethylmethylamino group; di(alkoxyalkyl)amino groups such as a di(methoxymethyl)amino group, a di(methoxyethyl)amino group, a di(ethoxymethyl)amino group, and a di(ethoxyethyl)amino group; and di(trialkylsilyl)amino groups such as a di(trimethylsilyl)amino group and a di(t-butyldimethylsilyl)amino group. Other examples thereof include di(alkylene oxide)amino groups such as a di(epoxy)amino group and a di(tetrahydrofuranyl)amino group; and di(alkylene oxide alkyl)amino groups such as a di(glycidyl)amino group and a di(tetrahydrofurfuryl)amino group. Additional examples thereof include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino groups include 1-polymethyleneimino groups such as a 1-pyrrolidinyl group, a 1-piperidino group, a 1-hexamethyleneimino group, a 1-heptamethyleneimino group, a 1-octamethyleneimino group, a 1-decamethyleneimino group, and a 1-dodecamethyleneimino group. Other examples of the cyclic amino groups include a 1-imidazolyl group, a 4,5-dihydro-1-imidazolyl group, a 1-imidazolidinyl group, a 1-piperazinyl group, and a morpholino group.

In terms of fuel economy, wet-grip performance, abrasion resistance, and the long-term stability and easy availability of the compound, the amino group in which the $R^8$ and $R^9$ are bonded to the nitrogen atom is preferably an acyclic amino group, more preferably a dialkylamino group, and still more preferably a dimethylamino group or a diethylamino group.

The compounds represented by the formula (III) can be exemplified by N,N-dialkyl-substituted carboxylic acid amide dialkyl acetal compounds.

Examples of the N,N-dialkyl-substituted carboxylic acid amide dialkyl acetal compounds include:
N,N-dialkylformamide dialkyl acetals such as
N,N-dimethylformamide dimethyl acetal,
N,N-diethylformamide dimethyl acetal,
N,N-di(n-propyl)formamide dimethyl acetal,
N,N-dimethylformamide diethyl acetal,
N,N-diethylformamide diethyl acetal,
N,N-di(n-propyl)formamide diethyl acetal,
N,N-dimethylformamide ethyl methyl acetal,
N,N-diethylformamide ethyl methyl acetal, and
N,N-di(n-propyl)formamide ethyl methyl acetal;
N,N-dialkylacetamide dialkyl acetals such as
N,N-dimethylacetamide dimethyl acetal,
N,N-diethylacetamide dimethyl acetal,
N,N-di(n-propyl)acetamide dimethyl acetal,
N,N-dimethylacetamide diethyl acetal,
N,N-diethylacetamide diethyl acetal,
N,N-di(n-propyl)acetamide diethyl acetal,
N,N-dimethylacetamide ethyl methyl acetal,
N,N-diethylacetamide ethyl methyl acetal, and
N,N-di(n-propyl)acetamide ethyl methyl acetal; and
N,N-dialkylpropionamide dialkyl acetals such as
N,N-dimethylpropionamide dimethyl acetal,
N,N-diethylpropionamide dimethyl acetal,
N,N-di(n-propyl)propionamide dimethyl acetal,
N,N-dimethylpropionamide diethyl acetal,
N,N-diethylpropionamide diethyl acetal,
N,N-di(n-propyl)propionamide diethyl acetal,
N,N-dimethylpropionamide ethyl methyl acetal,
N,N-diethylpropionamide ethyl methyl acetal, and
N,N-di(n-propyl)propionamide ethyl methyl acetal.

Among the examples, in terms of enhancing fuel economy, wet-grip performance, and abrasion resistance in good balance, N,N-dialkylformamide dialkyl acetals are preferred, and N,N-dimethylformamide dimethyl acetal, N,N-diethylformamide dimethyl acetal, N,N-dimethylformamide diethyl acetal, and N,N-diethylformamide diethyl acetal are more preferred.

In addition to the constituent unit derived from a conjugated diene (conjugated diene unit), the conjugated diene polymer may also contain a constituent unit derived from another monomer. Examples of other monomers include aromatic vinyls, vinyl nitriles, and unsaturated carboxylic acid esters. The aromatic vinyls can be exemplified by: styrene, α-methylstyrene, vinyltoluene, vinylnaphthalene, divinylbenzene, trivinylbenzene, and divinylnaphthalene. The vinyl nitriles can be exemplified by acrylonitrile and the like, and the unsaturated carboxylic acid esters can be exemplified by: methyl acrylate, ethyl acrylate, methyl methacrylate, ethyl methacrylate, and the like. Among these examples, aromatic vinyls are preferred, and styrene is more preferred.

The conjugated diene polymer preferably contains a constituent unit derived from an aromatic vinyl (aromatic vinyl unit) in terms of abrasion resistance. In this case, based on the total of the conjugated diene unit and the aromatic vinyl unit (=100% by mass), the aromatic vinyl unit content is preferably not less than 10% by mass (the conjugated diene unit content is not more than 90% by mass), and more preferably not less than 15% by mass (the conjugated diene unit content is not more than 85% by mass). In terms of fuel economy, the aromatic vinyl unit content is preferably not more than 50% by mass (the conjugated diene unit content is not less than 50% by mass), and more preferably not more than 45% by mass (the conjugated diene unit content is not less than 55% by mass).

With the conjugated diene unit content as 100 mol %, the conjugated diene polymer preferably has a vinyl bond content of not more than 80 mol %, and more preferably not more than 70 mol %, in terms of fuel economy. In terms of wet-grip performance, the vinyl bond content is preferably at least 10 mol %, more preferably at least 15 mol %, still more preferably at least 20 mol %, and particularly preferably at least 40 mol %. The vinyl bond content can be determined by infrared spectroscopic analysis, from the intensity of absorption band around 910 $cm^{-1}$ which is an absorption peak for a vinyl group.

In terms of fuel economy, the molecular weight distribution of the conjugated diene polymer is preferably 1 to 5, and more preferably 1 to 2. The molecular weight distribution can be determined by measuring the number-average molecular weight (Mn) and the weight-average molecular weight (Mw) by gel permeation chromatography (GPC) and then dividing Mw by Mn.

Suitable examples of the method for producing the conjugated diene polymer include a production method including Steps A and B mentioned below.

(Step A): A step of polymerizing monomers including a conjugated diene and a vinyl compound represented by the formula (IV) below in the presence of an alkali metal catalyst in a hydrocarbon solvent to give a polymer whose polymer chain contains a monomer unit derived from the conjugated diene and a monomer unit derived from the vinyl compound represented by the formula (IV), and has at least one terminal containing an alkali metal derived from the catalyst:

wherein $X^4$, $X^5$, and $X^6$ each independently represent a group represented by the formula (IVa) below, a hydrocarbyl group, or a substituted hydrocarbyl group, and at least one of the $X^4$, $X^6$, and $X^6$ is a group represented by the formula (IVa):

wherein $R^{10}$ and $R^{11}$ each independently represent a $C_{1-6}$ hydrocarbyl group, a $C_{1-6}$ substituted hydrocarbyl group, a silyl group, or a substituted silyl group, and the $R^{10}$ and $R^{11}$ may be bonded to each other to form a cyclic structure together with the nitrogen atom.

(Step B): A step of reacting the polymer obtained in Step A with a compound containing a group represented by the following formula (II):

wherein m represents an integer of 1 to 11; and A represents a functional group containing a nitrogen atom.

Examples of the alkali metal catalyst used in (Step A) include alkali metals, organoalkali metal compounds, alkali metal/polar compound complexes, and alkali metal-containing oligomers. The alkali metals can be exemplified by: lithium, sodium, potassium, rubidium, cesium, and the like. The organoalkali metal compounds can be exemplified by: ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, potassium naphthalenide, and the like. The alkali metal/polar compound complexes can be exemplified by a potassium-tetrahydrofuran complex, a potassium-diethoxyethane complex, and the like. The alkali metal-containing oligomers can be exemplified by a sodium salt of α-methylstyrene tetramer. Among these examples, organolithium compounds and organosodium compounds are preferred, and $C_{2-20}$ organolithium compounds or organosodium compounds are more preferred.

The hydrocarbon solvent used in (Step A) is a solvent that does not deactivate the organoalkali metal compound catalyst, and examples thereof include aliphatic hydrocarbons, aromatic hydrocarbons, and alicyclic hydrocarbons. The aliphatic hydrocarbons can be exemplified by: propane, n-butane, iso-butane, n-pentane, iso-pentane, n-hexane, propene, 1-butene, iso-butene, trans-2-butene, cis-2-butene, 1-pentene, 2-pentene, 1-hexene, 2-hexene, and the like. The aromatic hydrocarbons can be exemplified by: benzene, toluene, xylene, and ethylbenzene. The alicyclic hydrocarbons can be exemplified by cyclopentane, cyclohexane, and the like. One of these may be used alone, or two or more thereof may be used in combination. $C_{2-12}$ hydrocarbons are preferred among the examples.

In (Step A), monomers including a conjugated diene and a vinyl compound represented by the formula (IV) are polymerized to produce a conjugated diene polymer containing an alkali metal derived from the above-described alkali metal catalyst at the polymer chain terminal. Examples of the conjugated diene include 1,3-butadiene, isoprene, 1,3-pentadiene, 2,3-dimethyl-1,3-butadiene, and 1,3-hexadiene. One of these may be used alone, or two or more thereof may be used in combination. In terms of easy availability, 1,3-butadiene and isoprene are preferred among the examples.

The $X^4$, $X^5$, and $X^6$ in the formula (IV) each independently represent a group represented by the formula (IVa), a hydrocarbyl group, or a substituted hydrocarbyl group, and at least one of the $X^4$, $X^5$, and $X^6$ is a group represented by the formula (IVa).

The $R^{10}$ and $R^{11}$ in the formula (IVa) each independently represent a $C_{1-6}$ hydrocarbyl group, a $C_{1-6}$ substituted hydrocarbyl group, a silyl group, or a substituted silyl group, and the $R^{10}$ and $R^{11}$ may be bonded to each other to form a cyclic structure together with the nitrogen atom.

Examples of the $C_{1-6}$ hydrocarbyl group for the $R^{10}$ and $R^{11}$ include alkyl groups such as a methyl group, an ethyl group, a n-propyl group, an isopropyl group, a n-butyl group, a sec-butyl group, a tert-butyl group, a n-pentyl group, a neopentyl group, an isopentyl group, and a n-hexyl group; cycloalkyl groups such as a cyclohexyl group; and a phenyl group.

Examples of the $C_{1-6}$ substituted hydrocarbyl group for the $R^{10}$ and $R^{11}$ include substituted hydrocarbyl groups each containing at least one substituent selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as a dimethylaminoethyl group and a diethylaminoethyl group. The groups containing an oxygen atom-bearing group as a substituent can be exemplified by alkoxyalkyl groups such as a methoxymethyl group, a methoxyethyl group, an ethoxymethyl group, and an ethoxyethyl group. The groups containing a silicon atom-bearing group as a substituent can be exemplified by trialkylsilylalkyl groups such as a trimethylsilylmethyl group, and the like.

Examples of the substituted silyl group for the $R^{10}$ and $R^{11}$ include trialkylsilyl groups such as a trimethylsilyl group, a triethylsilyl group, and a t-butyldimethylsilyl group.

Examples of the group in which the $R^{10}$ and $R^{11}$ are bonded to each other include $C_{1-12}$ divalent groups optionally each containing at least one atom selected from the group consisting of a nitrogen atom, an oxygen atom, and a silicon atom. Specific examples thereof include alkylene groups such as a trimethylene group, a tetramethylene group, a pentamethylene group, and a hexamethylene group; oxydialkylene groups such as an oxydiethylene group and an oxydipropylene group; and nitrogenous groups such as the group represented by —CH$_2$CH$_2$—NH—CH$_2$— and the group represented by —CH$_2$CH$_2$—N=CH—.

The group in which the $R^{10}$ and $R^{11}$ are bonded to each other is preferably a nitrogenous group, and more preferably the group represented by —CH$_2$CH$_2$—NH—CH$_2$— or the group represented by —CH$_2$CH$_2$—N=CH—.

The hydrocarbyl group for the $R^{10}$ and $R^{11}$ is preferably an alkyl group, more preferably a $C_{1-4}$ alkyl group, still more preferably a methyl, ethyl, n-propyl, or n-butyl group, and particularly preferably an ethyl or n-butyl group. The substituted hydrocarbyl group for the $R^{10}$ and $R^{11}$ is preferably an alkoxyalkyl group, and more preferably a $C_{1-4}$ alkoxyalkyl group. The substituted silyl group for the $R^{10}$ and $R^{11}$ is preferably a trialkylsilyl group, and more preferably a trimethylsilyl group.

Preferably, the $R^{10}$ and $R^{11}$ are each an alkyl group, an alkoxyalkyl group, or a substituted silyl group, or are a nitrogenous group in which the $R^{10}$ and $R^{11}$ are bonded to each other, and they are each more preferably an alkyl group, still more preferably a $C_{1-4}$ alkyl group, and further preferably a methyl, ethyl, n-propyl, or n-butyl group.

Examples of the group represented by the formula (IVa) include acyclic amino groups and cyclic amino groups.

Examples of the acyclic amino groups include dialkylamino groups such as a dimethylamino group, a diethylamino group, a di(n-propyl)amino group, a di(isopropyl) amino group, a di(n-butyl)amino group, a di(sec-butyl)amino group, a di(tert-butyl)amino group, a di(neopentyl)amino group, and an ethylmethylamino group; di(alkoxyalkyl) amino groups such as a di(methoxymethyl)amino group, a di(methoxyethyl)amino group, a di(ethoxymethyl)amino group, and a di(ethoxyethyl)amino group; and di(trialkylsilyl)amino groups such as a di(trimethylsilyl)amino group and a di(t-butyldimethylsilyl)amino group.

Examples of the cyclic amino groups include 1-polymethyleneimino groups such as a 1-pyrrolidinyl group, a 1-piperidino group, a 1-hexamethyleneimino group, a 1-heptamethyleneimino group, a 1-octamethyleneimino group, a 1-decamethyleneimino group, and a 1-dodecamethyleneimino group. Other examples of the cyclic amino groups include a 1-imidazolyl group, a 4,5-dihydro-1-imidazolyl group, a 1-imidazolidinyl group, a 1-piperazinyl group, and a morpholino group.

In terms of economic efficiency and easy availability, the group represented by the formula (IVa) is preferably an acyclic amino group, more preferably a dialkylamino group, still more preferably a dialkylamino group containing a $C_{1-4}$ alkyl substituent, and further preferably a dimethylamino group, a diethylamino group, a di(n-propyl)amino group, or a di(n-butyl)amino group.

Examples of the hydrocarbyl group for the $X^4$, $X^5$, and $X^6$ in the formula (IV) include alkyl groups such as a methyl group, an ethyl group, a n-propyl group, an isopropyl group, a n-butyl group, a sec-butyl group, and a tert-butyl group. Examples of the substituted hydrocarbyl group include alkoxyalkyl groups such as a methoxymethyl group, an ethoxymethyl group, a methoxyethyl group, and an ethoxyethyl group.

The hydrocarbyl group for the $X^4$, $X^5$, and $X^6$ is preferably an alkyl group, more preferably a $C_{1-4}$ alkyl group, and still more preferably a methyl or ethyl group.

The substituted hydrocarbyl group for the $X^4$, $X^5$, and $X^6$ is preferably an alkoxyalkyl group, and more preferably a $C_{1-4}$ alkoxyalkyl group.

The hydrocarbyl group or substituted hydrocarbyl group for the $X^4$, $X^5$, and $X^6$ is preferably an alkyl or alkoxyalkyl group, more preferably a $C_{1-4}$ alkyl or $C_{1-4}$ alkoxyalkyl group, still more preferably a $C_{1-4}$ alkyl group, and further preferably a methyl or ethyl group.

At least one of the $X^4$, $X^5$, and $X^6$ in the formula (IV) is a group represented by the formula (IVa). It is preferable that at least two of the $X^4$, $X^5$, and $X^6$ be groups represented by the formula (IVa), and more preferably that two of the $X^4$, $X^5$, and $X^6$ be groups represented by the formula (IVa).

Examples of the vinyl compound represented by the formula (IV) used in (Step A) include compounds in which one of the $X^4$, $X^5$, and $X^6$ is an acyclic amino group represented by the formula (IVa) and the other two are each a hydrocarbyl group or a substituted hydrocarbyl group, e.g., (dialkylamino)dialkylvinylsilanes, {di(trialkylsilyl) amino}dialkylvinylsilanes, and (dialkylamino)dialkoxyalkylvinylsilanes.

The (dialkylamino)dialkylvinylsilanes can be exemplified by the following:
(dimethylamino)dimethylvinylsilane,
(ethylmethylamino)dimethylvinylsilane,
(diethylamino)dimethylvinylsilane,
(ethyl-n-propylamino)dimethylvinylsilane,
(ethylisopropylamino)dimethylvinylsilane,
(di(n-propyl)amino)dimethylvinylsilane,
(diisopropylamino)dimethylvinylsilane,
(n-butyl-n-propylamino)dimethylvinylsilane,
(di(n-butyl)amino)dimethylvinylsilane,
(dimethylamino)diethylvinylsilane,
(ethylmethylamino)diethylvinylsilane,
(diethylamino)diethylvinylsilane,
(ethyl-n-propylamino)diethylvinylsilane,
(ethylisopropylamino)diethylvinylsilane,
(di(n-propyl)amino)diethylvinylsilane,
(diisopropylamino)diethylvinylsilane,
(n-butyl-n-propylamino)diethylvinylsilane,
(di(n-butyl)amino)diethylvinylsilane,
(dimethylamino)dipropylvinylsilane,
(ethylmethylamino)dipropylvinylsilane,
(diethylamino)dipropylvinylsilane,
(ethyl-n-propylamino)dipropylvinylsilane,
(ethylisopropylamino)dipropylvinylsilane,
(di(n-propyl)amino)dipropylvinylsilane,
(diisopropylamino)dipropylvinylsilane,
(n-butyl-n-propylamino)dipropylvinylsilane,
(di(n-butyl)amino)dipropylvinylsilane,
(dimethylamino)dibutylvinylsilane,
(ethylmethylamino)dibutylvinylsilane,
(diethylamino)dibutylvinylsilane,
(ethyl-n-propylamino)dibutylvinylsilane,
(ethylisopropylamino)dibutylvinylsilane,
(di(n-propyl)amino)dibutylvinylsilane,
(diisopropylamino)dibutylvinylsilane,
(n-butyl-n-propylamino)dibutylvinylsilane,
(di(n-butyl)amino)dibutylvinylsilane, and the like.

The {di(trialkylsilyl)amino}dialkylvinylsilanes can be exemplified by the following:
{di(trimethylsilyl)amino}dimethylvinylsilane,
{di(t-butyldimethylsilyl)amino}dimethylvinylsilane,
{di(trimethylsilyl)amino}diethylvinylsilane,
{di(t-butyldimethylsilyl)amino}diethylvinylsilane, and the like.

The (dialkylamino)dialkoxyalkylvinylsilanes can be exemplified by the following:
(dimethylamino)dimethoxymethylvinylsilane,
(dimethylamino)dimethoxyethylvinylsilane,
(dimethylamino)diethoxymethylvinylsilane,
(dimethylamino)diethoxyethylvinylsilane,
(diethylamino)dimethoxymethylvinylsilane,
(diethylamino)dimethoxyethylvinylsilane,
(diethylamino)diethoxymethylvinylsilane,
(diethylamino)diethoxyethylvinylsilane, and the like.

Mention may be made of compounds in which two of the $X^4$, $X^5$, and $X^6$ are acyclic amino groups represented by the formula (IVa) and the other one is a hydrocarbyl group or substituted hydrocarbyl group, such as bis(dialkylamino)alkylvinylsilanes, bis{di(trialkylsilyl)amino}alkylvinylsilanes, and bis(dialkylamino)alkoxyalkylvinylsilanes.

The bis(dialkylamino)alkylvinylsilanes can be exemplified by the following:
bis(dimethylamino)methylvinylsilane,
bis(ethylmethylamino)methylvinylsilane,
bis(diethylamino)methylvinylsilane,
bis(ethyl-n-propylamino)methylvinylsilane,
bis(ethylisopropylamino)methylvinylsilane,
bis(di(n-propyl)amino)methylvinylsilane,
bis(diisopropylamino)methylvinylsilane,
bis(n-butyl-n-propylamino)methylvinylsilane,
bis(di(n-butyl)amino)methylvinylsilane,
bis(dimethylamino)ethylvinylsilane,
bis(ethylmethylamino)ethylvinylsilane,
bis(diethylamino)ethylvinylsilane,
bis(ethyl-n-propylamino)ethylvinylsilane,
bis(ethylisopropylamino)ethylvinylsilane,
bis(di(n-propyl)amino)ethylvinylsilane,
bis(diisopropylamino)ethylvinylsilane,
bis(n-butyl-n-propylamino)ethylvinylsilane,
bis(di(n-butyl)amino)ethylvinylsilane,
bis(dimethylamino)propylvinylsilane,
bis(ethylmethylamino)propylvinylsilane,
bis(diethylamino)propylvinylsilane,
bis(ethyl-n-propylamino)propylvinylsilane,
bis(ethylisopropylamino)propylvinylsilane,
bis(di(n-propyl)amino)propylvinylsilane,
bis(diisopropylamino)propylvinylsilane,
bis(n-butyl-n-propylamino)propylvinylsilane,
bis(di(n-butyl)amino)propylvinylsilane,
bis(dimethylamino)butylvinylsilane,
bis(ethylmethylamino)butylvinylsilane,
bis(diethylamino)butylvinylsilane,
bis(ethyl-n-propylamino)butylvinylsilane,
bis(ethylisopropylamino)butylvinylsilane,
bis(di(n-propyl)amino)butylvinylsilane,
bis(diisopropylamino)butylvinylsilane,
bis(n-butyl-n-propylamino)butylvinylsilane,
bis(di(n-butyl)amino)butylvinylsilane, and the like.

The bis{di(trialkylsilyl)amino}alkylvinylsilanes can be exemplified by the following:
bis{di(trimethylsilyl)amino}methylvinylsilane,
bis{di(t-butyldimethylsilyl)amino}methylvinylsilane,
bis{di(trimethylsilyl)amino}ethylvinylsilane,
bis{di(t-butyldimethylsilyl)amino}ethylvinylsilane, and the like.

The bis(dialkylamino)alkoxyalkylvinylsilanes can be exemplified by the following:
bis(dimethylamino)methoxymethylvinylsilane,
bis(dimethylamino)methoxyethylvinylsilane,
bis(dimethylamino)ethoxymethylvinylsilane,
bis(dimethylamino)ethoxyethylvinylsilane,
bis(diethylamino)methoxymethylvinylsilane,
bis(diethylamino)methoxyethylvinylsilane,
bis(diethylamino)ethoxymethylvinylsilane,
bis(diethylamino)ethoxyethylvinylsilane, and the like.

Mention may be made of compounds in which the three of $X^4$, $X^5$, and $X^6$ are acyclic amino groups represented by the formula (IVa), such as tri(dialkylamino)vinylsilanes.
Examples thereof include:
tri(dimethylamino)vinylsilane,
tri(ethylmethylamino)vinylsilane,
tri(diethylamino)vinylsilane,
tri(ethylpropylamino)vinylsilane,
tri(dipropylamino)vinylsilane, and
tri(butylpropylamino)vinylsilane.

Mention may be made of compounds in which two of the $X^4$, $X^5$, and $X^6$ are cyclic amino groups represented by the formula (IVa) and the other one is a hydrocarbyl group or substituted hydrocarbyl group, such as bis(morpholino)methylvinylsilane, bis(piperidino)methylvinylsilane, bis(4,5-dihydroimidazolyl)methylvinylsilane, and bis(hexamethyleneimino)methylvinylsilane.

The vinyl compound represented by formula (IV) in which two of the $X^4$, $X^5$, and $X^6$ are groups represented by the formula (IVa) is preferably a vinyl compound in which two of the $X^4$, $X^5$, and $X^6$ are acyclic amino groups, and, in terms of fuel economy, wet-grip performance, and abrasion resistance, is more preferably a bis(dialkylamino)alkylvinylsilane, and still more preferably bis(dimethylamino)methylvinylsilane, bis(diethylamino)methylvinylsilane, bis(di(n-propyl)amino)methylvinylsilane, or bis(di(n-butyl)amino)methylvinylsilane. In terms of availability of the compound, bis(diethylamino)methyl-vinylsilane and bis(di(n-butyl)amino)methylvinylsilane are preferred among these examples.

In (Step A), a combination of the conjugated diene and the vinyl compound represented by the formula (IV) with another monomer may be subjected to polymerization. Examples of other monomers include aromatic vinyls, vinyl nitriles, and unsaturated carboxylic acid esters. The aromatic vinyls can be exemplified by: styrene, α-methylstyrene, vinyltoluene, vinylnaphthalene, divinylbenzene, trivinylbenzene, and divinylnaphthalene. The vinyl nitriles can be exemplified by acrylonitrile and the like, and the unsaturated carboxylic acid esters can be exemplified by: methyl acrylate, ethyl acrylate, methyl methacrylate, ethyl methacrylate, and the like. Among these examples, aromatic vinyls are preferred, and styrene is more preferred.

In (Step A), polymerization may be carried out in the presence of agents such as an agent that regulates the vinyl bond content of the conjugated diene units and an agent that regulates the distributions of the conjugated diene units and constituent units derived from a monomer other than the conjugated diene in the conjugated diene polymer chain (these agents are collectively referred to below as "regulators"). Examples of such agents include ether compounds, tertiary amines, and phosphine compounds. The ether compounds can be exemplified by: cyclic ethers such as tetrahydrofuran, tetrahydropyran, and 1,4-dioxane; aliphatic monoethers such as diethyl ether and dibutyl ether; aliphatic polyethers such as ethylene glycol dimethyl ether, ethylene glycol diethyl ether, ethylene glycol dibutyl ether, diethylene glycol diethyl ether, and diethylene glycol dibutyl ether; aromatic ethers such as diphenyl ether and anisole; and the like. The tertiary amines can be exemplified by: triethylamine, tripropylamine, tributylamine, N,N,N',N'-tetramethylethylenediamine, N,N-diethylaniline, pyridine, quinoline, and the like. The phosphine compounds can be exemplified by: trimethylphosphine, triethylphosphine, triphenylphosphine, and the like. One of these may be used alone, or two or more thereof may be used in combination.

The polymerization temperature in (Step A) is typically 25° C. to 100° C., preferably 35° C. to 90° C., and more preferably 50° C. to 80° C. The polymerization time is typically 10 minutes to 5 hours.

In (Step B), the amount of the compound containing a group represented by the formula (II) which is to be brought into contact with the polymer prepared in Step A is typically 0.1 to 3 mol, preferably 0.5 to 2 mol, and more preferably 0.7 to 1.5 mol, per mol of the alkali metal from the alkali metal catalyst.

In (Step B), the polymer prepared in Step A is brought into contact with the compound containing a group represented by the formula (II) typically at a temperature of 25° C. to 100° C., preferably of 35° C. to 90° C., and more preferably of 50° C. to 80° C. The contact time is typically 60 seconds to 5 hours, preferably 5 minutes to 1 hour, and more preferably 15 minutes to 1 hour.

In the production method of the conjugated diene polymer, a coupling agent, if necessary, may be added to the hydrocarbon solution of the conjugated diene polymer from the initiation of polymerization of monomers using the alkali metal catalyst to the termination of polymerization. Examples of the coupling agent include compounds represented by the following formula (V):

$$R^{12}{}_a ML_{4-a} \quad\quad (V)$$

wherein $R^{12}$ represents an alkyl group, an alkenyl group, a cycloalkenyl group, or an aromatic residue; M represents a silicon atom or a tin atom; L represents a halogen atom or a hydrocarbyloxy group; and a represents an integer from 0 to 2.

The term "aromatic residue" herein denotes a monovalent group formed by removing a hydrogen bonded to the aromatic ring of an aromatic hydrocarbon.

The coupling agents represented by the formula (V) can be exemplified by: silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, diethoxydiethylsilane, and the like.

In terms of the processability of the conjugated diene polymer, the amount of the coupling agent is preferably not less than 0.03 mol, and more preferably not less than 0.05 mol, per mol of the alkali metal from the alkali metal catalyst. In terms of fuel economy, the amount is preferably not more than 0.4 mol, and more preferably not more than 0.3 mol.

The conjugated diene polymer can be recovered from the hydrocarbon solution of the conjugated diene polymer by a known recovery method, for example, (1) by the addition of a coagulant to the hydrocarbon solution of the conjugated diene polymer; or (2) by the addition of steam into the hydrocarbon solution of the conjugated diene polymer. The recovered conjugated diene polymer may be dried using a known drier such as a band dryer or an extrusion drier.

In the production method of the conjugated diene polymer, a treatment in which the group represented by the formula (Ia) in the polymer is replaced by a hydroxyl group is preferably carried out, for example, by hydrolysis. This treatment may be carried out on the polymer alone or as a composition as described later. Examples of the hydrolysis method include known methods such as a method using steam stripping. The treatment can convert the $X^1$, $X^2$, and/or $X^3$ in the formula (I) into hydroxyl groups and can thereby contribute to enhancement of fuel economy, wet-grip performance, and abrasion resistance in a more balanced manner.

The conjugated diene polymer can be used in the rubber component of the rubber composition of the present invention, and is preferably used in combination with, for example, other rubbers and additives.

Examples of other rubbers include conventional styrene-butadiene copolymer rubber, polybutadiene rubber (BR), butadiene-isoprene copolymer rubber, and butyl rubber. Natural rubber (NR), ethylene-propylene copolymer, ethylene-octene copolymer, and the like may also be mentioned. Two or more kinds of these rubbers may be used in combination. In particular, from the viewpoint that fuel economy, wet-grip performance, and abrasion resistance can be improved in good balance, use of NR and/or BR is preferred, and use of NR and BR in combination is more preferred.

The conjugated diene polymer content based on 100% by mass of the rubber component is preferably not less than 5% by mass, more preferably not less than 10% by mass, still more preferably not less than 30% by mass, and particularly preferably not less than 50% by mass. If the conjugated diene polymer content is less than 5% by mass, the effect of improving fuel economy is less likely to be obtained. The conjugated diene polymer content is preferably not more than 90% by mass, more preferably not more than 80% by mass, and still more preferably not more than 70% by mass. If the conjugated diene polymer content exceeds 90% by mass, abrasion resistance tends to decrease, and the cost tends to increase.

There are no particular limitations on the NR. For example, natural rubbers commonly used in the tire industry may be used, such as SIR20, RSS #3, TSR20, deproteinized natural rubber (DPNR), highly purified natural rubber (HPNR), and the like.

The NR content based on 100% by mass of the rubber component is preferably not less than 5% by mass, more preferably not less than 10% by mass, and still more preferably not less than 15% by mass. Abrasion resistance tends to decrease when the NR content is less than 5% by mass. The NR content is preferably not more than 70% by mass, and more preferably not more than 60% by mass. Wet-grip performance tends to decrease when the NR content is more than 70% by mass.

There are no particular limitations on the BR, and those commonly used in the tire industry may be used, such as high-cis BR such as BR1220 from Zeon Corporation and BR130B and BR150B from Ube Industries, Ltd., and BR containing syndiotactic polybutadiene crystals, such as VCR412 and VCR617 from Ube Industries, Ltd.

The BR content based on 100% by mass of the rubber component is preferably not less than 5% by mass, more preferably not less than 10% by mass, and still more preferably not less than 15% by mass. Abrasion resistance tends to decrease when the BR content is less than 5% by mass. The BR content is preferably not more than 60% by mass, more preferably not more than 50% by mass, still more preferably not more than 35% by mass, and particularly preferably not more than 25% by mass. Wet-grip performance tends to decrease when the BR content exceeds 60% by mass.

The total content of NR and BR, based on 100% by mass of the rubber component, is preferably not less than 10% by mass, more preferably not less than 20% by mass, and still more preferably not less than 30% by mass. Abrasion resistance tends to decrease when the total content is less than 10% by mass. The total content is preferably not more than 70% by mass, and more preferably not more than 50% by mass. Wet-grip performance tends to decrease when the total content exceeds 70% by mass.

The rubber composition of the present invention is characterized by containing silica as a reinforcing agent. The amount (content) of silica per 100 parts by mass of the rubber component is preferably 5 to 150 parts by mass, and more preferably 10 to 100 parts by mass. Abrasion resistance tends to be insufficient when the amount of silica is less than 5 parts by mass. Also, processability tends to deteriorate when the amount of silica exceeds 150 parts by mass. One kind of silica may be used alone, or two or more kinds thereof may be used in combination.

The silica preferably has a nitrogen adsorption specific surface area ($N_2SA$) of 40 to 400 $m^2/g$, and more preferably of 60 to 360 $m^2/g$. If the silica has a nitrogen adsorption specific surface area of less than 40 $m^2/g$, little reinforcing effect tends to be obtained and abrasion resistance tends to be reduced. If the silica has a nitrogen adsorption specific surface area of more than 400 $m^2/g$, its dispersibility tends to be poor and the hysteresis loss tends to increase, leading to reduced fuel economy.

The nitrogen adsorption specific surface area of silica is a value measured by the BET method in accordance with ASTM D3037-81.

The silica content based on 100% by mass of the total of silica and carbon black is preferably not less than 60% by mass, and more preferably not less than 85% by mass. The silica content is preferably not more than 98% by mass, and more preferably not more than 95% by mass. When the silica content is in the ranges, fuel economy, wet-grip performance, and abrasion resistance can be improved at high levels in good balance.

A silane coupling agent may be used together when the silica is added. Examples of the silane coupling agent include:
bis(3-triethoxysilylpropyl)tetrasulfide,
bis(3-triethoxysilylpropyl)trisulfide,
bis(3-triethoxysilylpropyl)disulfide,
bis(2-triethoxysilylethyl)tetrasulfide,
bis(3-trimethoxysilylpropyl)tetrasulfide,
bis(2-trimethoxysilylethyl)tetrasulfide,
3-mercaptopropyltrimethoxysilane,
3-mercaptopropyltriethoxysilane,
2-mercaptoethyltrimethoxysilane,
2-mercaptoethyltriethoxysilane,
3-trimethoxysilylpropyl-N,N-dimethylthiocarbamoyl-tetrasulfide,
3-triethoxysilylpropyl-N,N-dimethylthiocarbamoyl-tetrasulfide,
2-triethoxysilylethyl-N,N-dimethylthiocarbamoyl-tetrasulfide,
3-trimethoxysilylpropylbenzothiazole tetrasulfide,
3-triethoxysilylpropylbenzothiazolyltetrasulfide,
3-triethoxysilylpropyl methacrylate monosulfide,
3-trimethoxysilylpropyl methacrylate monosulfide, bis(3-diethoxymethylsilylpropyl)tetrasulfide,
3-mercaptopropyldimethoxymethylsilane,
dimethoxymethylsilylpropyl-N,N-dimethylthiocarbamoyltetrasulfide, and
dimethoxymethylsilylpropylbenzothiazole tetrasulfide.

Among these examples, bis(3-triethoxysilylpropyl)-tetrasulfide and 3-trimethoxysilylpropylbenzothiazolyl-tetrasulfide are preferred in terms of the reinforcement-improving effect. One of these silane coupling agents may be used alone, or two or more thereof may be used in combination.

The amount of the silane coupling agent per 100 parts by mass of the silica is preferably not less than 1 part by mass, and more preferably not less than 2 parts by mass. If the silane coupling agent is incorporated in an amount of less than 1 part by mass, the resulting unvulcanized rubber composition tends to have a high viscosity and its processability tends to deteriorate. The amount of the silane coupling agent per 100 parts by mass of the silica is preferably not more than 20 parts by mass, and more preferably not more than 15 parts by mass. If the silane coupling agent is incorporated in an amount of more than 20 parts by mass, an effect of the silane coupling agent commensurate with its amount tends not to be obtained and the cost tends to increase.

Known additives can be used and examples thereof include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organoperoxides; fillers such as carbon black, calcium carbonate, talc, alumina, clay, aluminum hydroxide, and mica; silane coupling agents; processing aids such as extender oil and lubricants; and antioxidants.

Examples of the carbon black include furnace blacks (furnace carbon blacks) such as SAF, ISAF, HAF, MAF, FEF, SRF, GPF, APF, FF, CF, SCF, and ECF; acetylene blacks (acetylene carbon blacks); thermal blacks (thermal carbon blacks) such as FT and MT; channel blacks (channel carbon blacks) such as EPC, MPC, and CC; and graphite. One of these may be used alone, or two or more thereof may be used in combination. From the viewpoint that fuel economy, wet-grip performance, and abrasion resistance can be improved at high levels in good balance, the carbon black content per 100 parts by mass of the rubber component is preferably not less than 1 part by mass, and more preferably not less than 3 parts by mass. The carbon black content is preferably not more than 30 parts by mass, and more preferably not more than 10 parts by mass.

The carbon black typically has a nitrogen adsorption specific surface area ($N_2SA$) of 5 to 200 $m^2/g$, and the lower limit thereof is preferably 50 $m^2/g$, while the upper limit thereof is preferably 150 $m^2/g$. The carbon black typically has a dibutyl phthalate (DBP) absorption of 5 to 300 mL/100 g, and the lower limit thereof is preferably 80 mL/100 g, while the upper limit thereof is preferably 180 mL/100 g. If the carbon black has an $N_2SA$ or DBP absorption less than the lower limit of the range, little reinforcing effect tends to be obtained and abrasion resistance tends to be reduced. In the case of exceeding the upper limit of the range, the carbon black tends to have poor dispersibility and the hysteresis loss tends to increase, leading to reduced fuel economy. The nitrogen adsorption specific surface area is measured according to ASTM D4820-93, and the DBP absorption is measured according to ASTM D2414-93. Applicable commercial products include those available from Tokai Carbon Co., Ltd. under the trade names SEAST 6, SEAST 7HM, and SEAST KH, those from Degussa under the trade names CK3 and Special Black 4A, and the like.

Examples of the extender oil include aromatic mineral oil (viscosity-gravity constant (VGC value)=0.900 to 1.049), naphthenic mineral oil (VGC value=0.850 to 0.899), and paraffinic mineral oil (VGC value=0.790 to 0.849). The polycyclic aromatic content of the extender oil is preferably less than 3% by mass, and more preferably less than 1% by mass. The polycyclic aromatic content is measured according to British Institute of Petroleum method 346/92. In addition, the aromatics content (CA) of the extender oil is preferably not less than 20% by mass. Two or more of these extender oils may be used in combination.

Examples of the vulcanization accelerators include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazole sulfenamide, N-t-butyl-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, di-ortho-tolylguanidine, and ortho-tolylbiguanidine. The amount to be used per 100 parts by mass of the rubber component is preferably 0.1 to 5 parts by mass, and more preferably 0.2 to 3 parts by mass.

Known methods can be used in order to add other rubbers, additives, and the like, to the conjugated diene polymer to prepare the rubber composition. For example, a method may be employed in which ingredients are mixed using a known mixer, e.g., a roll or Banbury mixer.

With regard to the mixing conditions when additives other than vulcanizing agents and vulcanization accelerators are added, the mixing temperature is typically 50° C. to 200° C., preferably 80° C. to 190° C., and the mixing time is typically 30 seconds to 30 minutes, preferably 1 to 30 minutes. When a vulcanizing agent and vulcanization accelerator are added, the mixing temperature is typically not higher than 100° C., and preferably from room temperature to 80° C. The composition in which the vulcanizing agent and vulcanization accelerator have been incorporated is typically subjected to a vulcanizing treatment such as press vulcanization before use. The vulcanization temperature is typically 120° C. to 200° C., and preferably 140° C. to 180° C.

The rubber composition of the present invention exhibits an excellent balance among fuel economy, wet-grip performance, and abrasion resistance and achieves significant improvement in these properties.

The rubber composition of the present invention can be suitably used for various tire components and is particularly well suited for treads.

The pneumatic tire of the present invention can be formed from the rubber composition by a usual method. Specifically, an unvulcanized rubber composition, in which various additives have been incorporated as necessary, is extrusion-processed into the shape of a tire tread and is then arranged by a usual method in a tire building machine and assembled with other tire components to form an unvulcanized tire. This unvulcanized tire is subjected to heat and pressure in a vulcanizer to form a pneumatic tire according to the present invention.

The pneumatic tire of the present invention can be suitably used as tires for passenger automobiles and tires for trucks/buses (heavy duty tires).

EXAMPLES

The present invention is described in detail by the following examples.

The property evaluations were carried out using the following methods. In the following evaluations, Comparative Example 1 was used as a reference for comparison with Examples 1 to 5 and Comparative Examples 2 to 4, and Comparative Example 5 was used as a reference for comparison with Example 6.

1. Vinyl Bond Content (Unit: Mol %)

The vinyl bond content of a polymer was determined by infrared spectroscopic analysis, from the intensity of absorption band around 910 $cm^{-1}$ which is an absorption peak for a vinyl group.

2. Styrene Unit Content (Unit: % by Mass)

According to JIS K6383 (1995), the styrene unit content of a polymer was determined from the refractive index.

3. Molecular Weight Distribution (Mw/Mn)

The weight-average molecular weight (Mw) and the number-average molecular weight (Mn) were measured by gel permeation chromatography (GPC) under the conditions (1) to (8) described below. The molecular weight distribution (Mw/Mn) of a polymer was then determined from the measured Mw and Mn.

(1) Instrument: HLC-8020 from Tosoh Corporation
(2) Separation columns: 2×GMH-XL in tandem, from Tosoh Corporation
(3) Measurement temperature: 40° C.
(4) Carrier: Tetrahydrofuran
(5) Flow rate: 0.6 mL/minute
(6) Injection amount: 5 μL
(7) Detector: Differential refractometer
(8) Molecular weight standards: Polystyrene standards 4. tan δ

A test specimen strip (width 1 mm or 2 mm×length 40 mm) was punched from a sheet of the vulcanized rubber composition and subjected to testing. Using a spectrometer from Ueshima Seisakusho Co., Ltd., the tan δ was measured at a dynamic strain amplitude of 1%, a frequency of 10 Hz, and a temperature of 50° C. The value of the reciprocal of tan δ was expressed as an index relative to the value of the reference for comparison (=100). A larger numerical value indicates lower rolling resistance and therefore better fuel economy.

5. Rolling Resistance

The rolling resistance was measured using a rolling resistance tester by running a test tire on a rim of 15×6JJ with an internal air pressure of 230 kPa, under a load of 3.43 kN at a speed of 80 km/h. The resulting value was expressed as an index relative to the value of the reference for comparison (=100). A larger index value is better (better fuel economy).

6. Wet-Grip Performance

Test tires were mounted on all the wheels of a vehicle (domestic, FF, 2000 cc) and the braking distance was determined with an initial speed of 100 km/h on a wet asphalt road surface. The resulting value was expressed as an index, with larger numbers indicating better wet-skid performance (wet-grip performance). Indexing was performed using the following formula.

Wet-skid performance=(Braking distance of the reference for comparison)/(Braking distance of the particular example or comparative example)×100

7. Abrasion Test Using LAT

The volume loss of each vulcanized rubber composition was measured using a LAT tester (Laboratory Abrasion and Skid Tester) under the conditions of: load 50N, speed 20 km/h, and slip angle 5°. The numerical values (LAT indices) shown in Tables 2 and 3 are values relative to the volume loss of the reference for comparison (=100). The larger the value, the better the abrasion resistance.

Production Example 1

Synthesis of Polymer 1

The inside of a stainless steel polymerization reactor having an internal volume of 20 L was washed, dried, and then substituted with dry nitrogen. The polymerization reactor was charged with 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether. Next, 11.5 mmol of bis(diethylamino)methylvinylsilane and 14.1 mmol of n-butyllithium were introduced as a cyclohexane solution and a n-hexane solution, respectively, to initiate polymerization.

The copolymerization of 1,3-butadiene and styrene was performed for three hours under stirring at a rate of 130 rpm and a temperature inside the polymerization reactor of 65° C., while continuously feeding the monomers into the polymerization reactor. The amount of 1,3-butadiene and the amount of styrene fed over the whole polymerization were 821 g and 259 g, respectively.

The resulting polymer solution was then stirred at a rate of 130 rpm, and 11.5 mmol of N,N-dimethylformamide dimethyl acetal was added, and stirred for 15 minutes. A hexane solution (20 mL) containing 0.54 mL of methanol was then added to the polymer solution, and the polymer solution was stirred for five minutes.

To the polymer solution were then added 1.8 g of 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g of pentaerythrityl tetrakis (3-laurylthiopropionate) (trade name: Sumilizer TP-D, from Sumitomo Chemical Co., Ltd.). Polymer 1 was then recovered from the resulting polymer solution by steam stripping. The evaluation results of polymer 1 are shown in Table 1. The amount of a constituent unit represented by the formula (I) in the polymer, which was calculated from the amounts of raw materials introduced and fed into the polymerization reactor, was 0.006 mmol/g-polymer (per unit mass of the polymer).

Production Example 2

Synthesis of Polymer 2

The inside of a stainless steel polymerization reactor having an internal volume of 20 L was washed, dried, and then substituted with dry nitrogen. The polymerization reactor was charged with 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether. Next, 14.1 mmol of n-butyllithium was introduced as a n-hexane solution, and the 1,3-butadiene and styrene were copolymerized for one hour. During the copolymerization, the stirring rate was set to 130 rpm, the temperature inside the polymerization reactor was set to 65° C., and the monomers were continuously fed into the polymerization reactor.

After the polymerization for one hour, 11.0 mmol of bis (diethylamino)methylvinylsilane was introduced as a cyclohexane solution into the polymerization reactor under stirring at a rate of 130 rpm and a temperature inside the polymerization reactor of 65° C.

Next, the 1,3-butadiene and styrene were copolymerized for 0.5 hours, while the monomers were continuously fed into the polymerization reactor. During the polymerization, the stirring rate was set to 130 rpm, and the temperature inside the polymerization reactor was set to 65° C.

After the polymerization for 0.5 hours, 11.0 mmol of bis (diethylamino)methylvinylsilane was introduced as a cyclohexane solution into the polymerization reactor under stirring at a rate of 130 rpm and a temperature inside the polymerization reactor of 65° C.

Next, the 1,3-butadiene and styrene were copolymerized for 0.5 hours, while the monomers were continuously fed into the polymerization reactor. During the polymerization, the stirring rate was set to 130 rpm, and the temperature inside the polymerization reactor was set to 65° C.

After the polymerization for 0.5 hours, 11.0 mmol of bis (diethylamino)methylvinylsilane was introduced as a cyclohexane solution into the polymerization reactor under stirring at a rate of 130 rpm and a temperature inside the polymerization reactor of 65° C.

Next, the 1,3-butadiene and styrene were copolymerized for 0.5 hours, while the monomers were continuously fed into the polymerization reactor. During the polymerization, the stirring rate was set to 130 rpm, and the temperature inside the polymerization reactor was set to 65° C. The amount of 1,3-butadiene and the amount of styrene fed over the whole polymerization were 821 g and 259 g, respectively.

The resulting polymer solution was then stirred at a rate of 130 rpm, and 11.0 mmol of N,N-dimethylformamide dimethyl acetal was added, and stirred for 15 minutes. A hexane solution (20 mL) containing 0.54 mL of methanol was then added to the polymer solution, and the polymer solution was stirred for five minutes.

To the polymer solution were then added 1.8 g of 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g of pentaerythrityl tetrakis (3-laurylthiopropionate) (trade name: Sumilizer TP-D, from Sumitomo Chemical Co., Ltd.). Polymer 2 was then recovered from the resulting polymer solution by steam stripping. The evaluation results of polymer 2 are shown in Table 1. The amount of a constituent unit represented by the formula (I) in the polymer, which was calculated from the amounts of raw materials introduced and fed into the polymerization reactor, was 0.018 mmol/g-polymer (per unit mass of the polymer).

Production Example 3

Synthesis of Polymer 3

The inside of a stainless steel polymerization reactor having an internal volume of 5 L was washed, dried, and then substituted with dry nitrogen. The polymerization reactor was charged with 2.55 kg of hexane (specific gravity=0.68 g/cm$^3$), 137 g of 1,3-butadiene, 43 g of styrene, 1.5 mL of tetrahydrofuran, and 1.2 mL of ethylene glycol diethyl ether. Next, 3.6 mmol of n-butyllithium was introduced as a n-hexane solution, and the 1,3-butadiene and styrene were copolymerized for 2.5 hours. During the copolymerization, the stirring rate was set to 130 rpm, the temperature inside the polymerization reactor was set to 65° C., and the monomers were continuously fed into the polymerization reactor. The amount of fed 1,3-butadiene and the amount of fed styrene were 205 g and 65 g, respectively.

After the copolymerization for 2.5 hours, 2.8 mmol of bis(diethylamino)methylvinylsilane was introduced as a cyclohexane solution into the polymerization reactor under stirring at a rate of 130 rpm and a temperature inside the polymerization reactor of 65° C., followed by stirring for 30 minutes. Next, a hexane solution (20 mL) containing 0.14 mL of methanol was introduced into the polymerization reactor, and the polymer solution was stirred for five minutes.

To the polymer solution were then added 1.8 g of 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g of pentaerythrityl tetrakis (3-laurylthiopropionate) (trade name: Sumilizer TP-D, from Sumitomo Chemical Co., Ltd.). Polymer 3 was then recovered from the resulting polymer solution by steam stripping.

The evaluation results of polymer 3 are shown in Table 1. The amount of a constituent unit represented by the formula (I) in the polymer, which was calculated from the amounts of raw materials introduced and fed into the polymerization reactor, was 0.006 mmol/g-polymer (per unit mass of the polymer).

Production Example 4

Synthesis of polymer 4

The inside of a stainless steel polymerization reactor having an internal volume of 20 L was washed, dried, and then substituted with dry nitrogen. The polymerization reactor was charged with 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether. Next, 11.5 mmol of bis(diethylamino)methylvinylsilane and 14.1 mmol of n-butyllithium were introduced as a cyclohexane solution and a n-hexane solution, respectively, to initiate polymerization.

The copolymerization of 1,3-butadiene and styrene was performed for three hours under stirring at a rate of 130 rpm and a temperature inside the polymerization reactor of 65° C., while continuously feeding the monomers into the polymerization reactor. The amount of 1,3-butadiene and the amount of styrene fed over the whole polymerization were 821 g and 259 g, respectively.

A hexane solution (20 mL) containing 0.54 mL of methanol was then added to the polymer solution, and the polymer solution was stirred for five minutes.

To the polymer solution were then added 1.8 g of 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g of pentaerythrityl tetrakis (3-laurylthiopropionate) (trade name: Sumilizer TP-D, from Sumitomo Chemical Co., Ltd.). Polymer 4 was then recovered from the resulting polymer solution by steam stripping. The evaluation results of polymer 4 are shown in Table 1. The amount of a constituent unit represented by the formula (I) in the polymer, which was calculated from the amounts of raw materials introduced and fed into the polymerization reactor, was 0.006 mmol/g-polymer (per unit mass of the polymer).

Production Example 5

Synthesis of Polymer 5

The inside of a stainless steel polymerization reactor having an internal volume of 20 L was washed, dried, and then substituted with dry nitrogen. The polymerization reactor was charged with 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether. Next, 14.1 mmol of n-butyllithium was introduced as a n-hexane solution to initiate polymerization.

The copolymerization of 1,3-butadiene and styrene was performed for three hours under stirring at a rate of 130 rpm and a temperature inside the polymerization reactor of 65° C., while continuously feeding the monomers into the polymerization reactor. The amount of 1,3-butadiene and the amount of styrene fed over the whole polymerization were 821 g and 259 g, respectively.

The resulting polymer solution was then stirred at a rate of 130 rpm, and 11.5 mmol of N,N-dimethylformamide dimethyl acetal was added, and stirred for 15 minutes. A hexane solution (20 mL) containing 0.54 mL of methanol was then added to the polymer solution, and the polymer solution was stirred for five minutes.

To the polymer solution were then added 1.8 g of 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g of pentaerythrityl tetrakis (3-laurylthiopropionate) (trade name: Sumilizer TP-D, from Sumitomo Chemical Co., Ltd.). Polymer 5 was then recovered from the resulting polymer solution by steam stripping. The evaluation results of polymer 5 are shown in Table 1. Since polymer 5 was synthesized without using a compound represented by the formula (IV), polymer 5 did not contain any constituent unit represented by the formula (I).

Production Example 6

Synthesis of Polymer 6

The inside of a stainless steel polymerization reactor having an internal volume of 20 L was washed, dried, and then substituted with dry nitrogen. The polymerization reactor was charged with 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether. Next, 14.1 mmol of n-butyllithium was introduced as a n-hexane solution to initiate polymerization.

The copolymerization of 1,3-butadiene and styrene was performed for three hours under stirring at a rate of 130 rpm and a temperature inside the polymerization reactor of 65° C., while continuously feeding the monomers into the polymerization reactor. The amount of 1,3-butadiene and the amount of styrene fed over the whole polymerization were 821 g and 259 g, respectively.

A hexane solution (20 mL) containing 0.54 mL of methanol was then added to the polymer solution, and the polymer solution was stirred for five minutes.

To the polymer solution were then added 1.8 g of 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g of pentaerythrityl tetrakis (3-laurylthiopropionate) (trade name: Sumilizer TP-D, from Sumitomo Chemical Co., Ltd.). Polymer 6 was then recovered from the resulting polymer solution by steam stripping. The evaluation results of polymer 6 are shown in Table 1. Since polymer 6 was synthesized without using a compound represented by the formula (IV), polymer 6 did not contain any constituent unit represented by the formula (I).

Production Example 7

Synthesis of Polymer 7

The inside of a stainless steel polymerization reactor having an internal volume of 20 L was washed, dried, and then substituted with dry nitrogen. The polymerization reactor was charged with 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether. Next, 11.5 mmol of bis(diethylamino)methylvinylsilane and 14.1 mmol of n-butyllithium were introduced as a cyclohexane solution and a n-hexane solution, respectively, to initiate polymerization.

The copolymerization of 1,3-butadiene and styrene was performed for three hours under stirring at a rate of 130 rpm and a temperature inside the polymerization reactor of 65° C., while continuously feeding the monomers into the polymerization reactor. The amount of 1,3-butadiene and the amount of styrene fed over the whole polymerization were 821 g and 259 g, respectively.

The resulting polymer solution was then stirred at a rate of 130 rpm, and 11.5 mmol of N,N-dimethylformamide dimethyl acetal was added, and stirred for 15 minutes. A hexane solution (20 mL) containing 0.54 mL of methanol was then added to the polymer solution, and the polymer solution was stirred for five minutes.

To the polymer solution were then added 1.8 g of 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g of pentaerythrityl tetrakis (3-laurylthiopropionate) (trade name: Sumilizer TP-D, from Sumitomo Chemical Co., Ltd.). Next, the polymer solution was evaporated at ordinary temperature for 24 hours, and further dried in vacuo at 55° C. for 12 hours, so that polymer 7 was obtained. The evaluation results of polymer 7 are shown in Table 1. The amount of a constituent unit represented by the formula (I) in the polymer, which was calculated from the amounts of raw materials introduced and fed into the polymerization reactor, was 0.006 mmol/g-polymer (per unit mass of the polymer).

Antioxidant: Antigene 3C from Sumitomo Chemical Co., Ltd.
Stearic acid: stearic acid beads "Tsubaki" from NOF Corporation
Zinc oxide: zinc oxide #1 from Mitsui Mining & Smelting Co., Ltd.
Wax: Sunnoc N from Ouchi Shinko Chemical Industrial Co., Ltd.
Sulfur: sulfur powder from Tsurumi Chemical Industry Co., Ltd.
Vulcanization accelerator 1: Soxinol CZ from Sumitomo Chemical Co., Ltd.
Vulcanization accelerator 2: Soxinol D from Sumitomo Chemical Co., Ltd.

Examples 1 to 6 and Comparative Examples 1 to 5

According to each formulation shown in Table 2 or 3, materials other than the sulfur and vulcanization accelerators were mixed for 5 minutes at 150° C. using a 1.7-L Banbury mixer from Kobe Steel, Ltd., to obtain a kneaded mixture. The sulfur and vulcanization accelerators were then added to the kneaded mixture, and they were mixed using an open roll mill

TABLE 1

|  | Polymer 1 | Polymer 2 | Polymer 3 | Polymer 4 | Polymer 5 | Polymer 6 | Polymer 7 |
|---|---|---|---|---|---|---|---|
| Styrene unit content (% by mass) | 25 | 25 | 25 | 25 | 25 | 24 | 24 |
| Vinyl bond content (mol %) | 59 | 59 | 59 | 60 | 59 | 59 | 60 |
| Molecular weight distribution (Mw/Mn) | 1.6 | 1.3 | 1.1 | 1.3 | 1.1 | 1.1 | 1.2 |

The chemicals used in the examples and comparative examples are described below.
Natural rubber: RSS #3
Butadiene rubber: Ubepol BR150B from Ube Industries, Ltd.
Polymers 1 to 7: see Production Examples 1 to 7 above
Silica: Ultrasil VN3-G ($N_2SA$: 175 $m^2/g$) from Degussa
Silane coupling agent: Si69 (bis(3-triethoxysilylpropyl)-tetrasulfide) from Degussa
Carbon black: Diablack N339 ($N_2SA$: 96 $m^2/g$, DBP absorption: 124 mL/100 g) from Mitsubishi Chemical Corporation
Oil: X-140 from Japan Energy Corporation for 5 minutes at 80° C. to obtain an unvulcanized rubber composition. The unvulcanized rubber composition was press-vulcanized for 20 minutes at 170° C. in a 0.5 mm-thick mold to obtain a vulcanized rubber composition.

In addition, the unvulcanized rubber composition was formed into a tread shape, and assembled with other tire components in a tire building machine to form an unvulcanized tire. The unvulcanized tire was vulcanized for 12 minutes at 170° C. to prepare a test tire (size: 195/65R$^{15}$).

The thus obtained vulcanized rubber compositions and test tires were evaluated by the previously described test methods. Tables 2 and 3 show the results of these tests.

TABLE 2

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Formulation (part(s) by mass) | Natural rubber | 20 | 20 | 20 | 20 | 20 | 20 | 20 | 20 | 20 |
| | Butadiene rubber | 20 | 20 | 20 | 20 | 20 | 20 | 20 | 20 | 20 |
| | Polymer 1 | 60 | — | 20 | 60 | — | — | — | — | — |
| | Polymer 2 | — | 60 | — | — | — | — | — | — | — |
| | Polymer 3 | — | — | 40 | — | — | — | 60 | — | — |
| | Polymer 4 | — | — | — | — | — | — | — | 60 | — |
| | Polymer 5 | — | — | — | — | — | — | — | — | 60 |
| | Polymer 6 | — | — | — | — | — | 60 | — | — | — |
| | Polymer 7 | — | — | — | — | 60 | — | — | — | — |
| | Silica | 75 | 75 | 75 | 50 | 75 | 75 | 75 | 75 | 75 |
| | Silane coupling agent | 6 | 6 | 6 | 4 | 6 | 6 | 6 | 6 | 6 |
| | Carbon black | 5 | 5 | 5 | 5 | 5 | 5 | 5 | 5 | 5 |
| | Oil | 20 | 20 | 20 | 5 | 20 | 20 | 20 | 20 | 20 |
| | Antioxidant | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 |
| | Sulfur | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 |

TABLE 2-continued

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
|  | Vulcanization accelerator 2 | 1.2 | 1.2 | 1.2 | 1.2 | 1.2 | 1.2 | 1.2 | 1.2 | 1.2 |
| Evaluation | tan δ (index) | 129 | 139 | 125 | 135 | 130 | 100 | 117 | 118 | 113 |
|  | Rolling resistance (index) | 134 | 138 | 126 | 136 | 121 | 100 | 110 | 112 | 110 |
|  | Wet-grip performance (index) | 131 | 136 | 135 | 130 | 125 | 100 | 111 | 114 | 110 |
|  | Abrasion resistance (index) | 120 | 125 | 119 | 118 | 116 | 100 | 115 | 118 | 113 |

TABLE 3

|  |  | Comparative Example 5 | Example 6 |
|---|---|---|---|
| Formulation (part(s) by mass) | Natural rubber | — | — |
|  | Butadiene rubber | — | — |
|  | Polymer 1 | — | 60 |
|  | Polymer 2 | — | — |
|  | Polymer 3 | — | — |
|  | Polymer 4 | — | — |
|  | Polymer 5 | — | — |
|  | Polymer 6 | 100 | 40 |
|  | Polymer 7 | — | — |
|  | Silica | 75 | 75 |
|  | Silane coupling agent | 6 | 6 |
|  | Carbon black | 5 | 5 |
|  | Oil | 20 | 20 |
|  | Antioxidant | 1.5 | 1.5 |
|  | Stearic acid | 2 | 2 |
|  | Zinc oxide | 2.5 | 2.5 |
|  | Wax | 1 | 1 |
|  | Sulfur | 2 | 2 |
|  | Vulcanization accelerator 1 | 1.8 | 1.8 |
|  | Vulcanization accelerator 2 | 1.2 | 1.2 |
| Evaluation | tan δ (index) | 100 | 125 |
|  | Rolling resistance (index) | 100 | 128 |
|  | Wet-grip performance (index) | 100 | 128 |
|  | Abrasion resistance (index) | 100 | 118 |

As shown in Tables 2 and 3, the rubber compositions of the examples each of which contained the polymer (polymer 1, 2, or 7) containing a constituent unit derived from a conjugated diene and a constituent unit represented by the formula (I) and having a terminal modified by a compound containing a group represented by the formula (II), exhibited a well-balanced improvement in fuel economy, wet-grip performance, and abrasion resistance compared with the rubber compositions of the comparative examples.

The invention claimed is:

1. A rubber composition, comprising a rubber component and silica, wherein the rubber component comprises 10 to 60% by mass natural rubber and 10 to 60% by mass butadiene rubber, based on 100% by mass of the rubber component, and the rubber component contains not less than 5% by mass of a conjugated diene polymer, based on 100% by mass of the rubber component, and wherein the silica is contained in an amount of 5 to 150 parts by mass per 100 parts by mass of the rubber component, the conjugated diene polymer comprising a constituent unit derived from a conjugated diene and a constituent unit represented by the following formula (I):

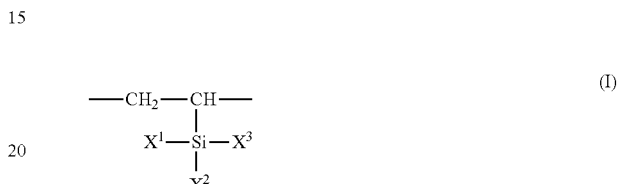

wherein $X^1$, $X^2$, and $X^3$ each independently represent a group represented by the formula (Ia) below, a hydroxyl group, a hydrocarbyl group, or a substituted hydrocarbyl group, and at least one of the $X^1$, $X^2$, and $X^3$ is a hydroxyl group or a group represented by the formula (Ia):

wherein $R^1$ and $R^2$ each independently represent a $C_{1-6}$ hydrocarbyl group, a $C_{1-6}$ substituted hydrocarbyl group, a silyl group, or a substituted silyl group, and the $R^1$ and $R^2$ may be bonded to each other to form a cyclic structure together with the nitrogen atom, at least one terminal of the conjugated diene polymer being modified by a compound containing a group represented by the following foiinula (II):

wherein m represents an integer of 1 to 11; and A represents a functional group containing a nitrogen atom.

2. The rubber composition according to claim 1, wherein the $R^1$ and $R^2$ in the formula (Ia) are $C_{1-6}$ hydrocarbyl groups.

3. The rubber composition according to claim 1, wherein two of the $X^1$, $X^2$, and $X^3$ in the formula (I) are selected from the group consisting of a group represented by the formula (Ia) and a hydroxyl group.

4. The rubber composition according to claim 1, wherein the compound containing a group represented by the formula (II) is a compound represented by the following formula (III):

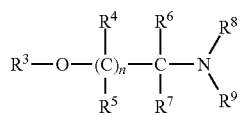
(III)

wherein n represents an integer of 0 to 10; $R^3$ represents a $C_{1-5}$ hydrocarbyl group; $R^4$, $R^5$, $R^6$, and $R^7$ each independently represent a hydrogen atom, a $C_{1-5}$ hydrocarbyl group, a $C_{1-5}$ substituted hydrocarbyl group, or a $C_{1-5}$ hydrocarbyloxy group, and when a plurality of $R^4$s and a plurality of $R^5$s are present, the plurality of $R^4$s and the plurality of $R^5$s may be the same or different from one another; $R^8$ and $R^9$ each independently represent a $C_{1-6}$ group optionally containing at least one atom selected from the group consisting of a nitrogen atom, an oxygen atom, and a silicon atom, the $R^8$ and $R^9$ may be bonded to each other to form a cyclic structure together with the nitrogen atom, and the $R^8$ and $R^9$ may form a single group bonded to the nitrogen via a double bond.

5. The rubber composition according to claim 4, wherein one of the $R^6$ and $R^7$ in the formula (III) is a hydrogen atom.

6. The rubber composition according to claim 1, wherein the conjugated diene polymer has a vinyl bond content of at least 10 mol % but not more than 80 mol %, based on 100 mol % of the constituent unit derived from a conjugated diene.

7. The rubber composition according to claim 1, wherein the silica has a nitrogen adsorption specific surface area of 40 to 400 $m^2$/g.

8. The rubber composition according to claim 1, which is for use as a rubber composition for a tread.

9. A pneumatic tire, formed from the rubber composition according to claim 1.

* * * * *